(12) United States Patent
Araujo et al.

(10) Patent No.: US 11,822,673 B2
(45) Date of Patent: Nov. 21, 2023

(54) GUIDED MICRO-FUZZING THROUGH HYBRID PROGRAM ANALYSIS

(71) Applicant: International Business Machines Corporation, Armonk, NY (US)

(72) Inventors: Frederico Araujo, Mahopac, NY (US); William Blair, Brighton, MA (US); Sanjeev Das, White Plains, NY (US); Jiyong Jang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 17/444,497

(22) Filed: Aug. 5, 2021

(65) Prior Publication Data
US 2023/0044951 A1 Feb. 9, 2023

(51) Int. Cl.
*G06F 21/57* (2013.01)
*H04L 9/40* (2022.01)
*G06F 11/07* (2006.01)

(52) U.S. Cl.
CPC .......... *G06F 21/577* (2013.01); *G06F 11/079* (2013.01); *H04L 63/20* (2013.01); *G06F 2221/033* (2013.01)

(58) Field of Classification Search
CPC ....... G06F 21/577; G06F 11/079; H04L 63/20
See application file for complete search history.

(56) References Cited

U.S. PATENT DOCUMENTS

| | | | |
|---|---|---|---|
| 9,552,285 B2 | 1/2017 | Godefroid | |
| 10,586,053 B2 | 3/2020 | Kim et al. | |
| 10,628,281 B2* | 4/2020 | Phan | G06F 21/577 |
| 2009/0125976 A1* | 5/2009 | Wassermann | G06F 8/00 717/124 |
| 2018/0124094 A1* | 5/2018 | Hamdi | G06F 12/0868 |
| 2021/0397543 A1* | 12/2021 | Wu | G06F 11/3688 |
| 2022/0082616 A1* | 3/2022 | Doshi | G06F 11/1438 |

FOREIGN PATENT DOCUMENTS

CN 102799529 B 11/2015
WO WO2015158742 A1 10/2015

OTHER PUBLICATIONS

Mansour Al-Qattan (Program Transformations for Vulnerability Detection in Binary Executable Files, PHD thesis, 2017, 228 pages (Year: 2017).*
Bayerri, "Grammar and Model Extraction for Security Applications using Dynamic Program Binary Analysis," Thesis, Carnegie Mellon University, Pittsburgh, PA, Sep. 2010, 257 pages.
(Continued)

*Primary Examiner* — Oleg Korsak
(74) *Attorney, Agent, or Firm* — Yee & Associates, P.C.

(57) ABSTRACT

Program analysis is provided. An intermediate representation of a program is generated. A set of structured inputs is provided to the program. The set of structured inputs are derived from the intermediate representation. The program is executed using the set of structured inputs. A set of action steps is performed in response to observing a violation of a policy during execution of the program using the structured inputs.

20 Claims, 9 Drawing Sheets

(56) References Cited

OTHER PUBLICATIONS

Takashima et al., "SyRust: Automatic Testing of Rust Libraries with Semantic-Aware Program Synthesis," Proceedings of the 42nd ACM SIGPLAN International Conference on Programming Language Design and Implementation (PLDI '21,) Jun. 20-25, 2021, Virtual, Canada, pp. 899-913.
Jung et al., "Winnie: Fuzzing Windows Applications with Harness Synthesis and Fast Cloning," Network and Distributed Systems Security (NDSS) Symposium 2021, Feb. 21-25, 2021, 17 pages.
Zhang et al., "IntelliGen: Automatic Driver Synthesis for Fuzz Testing," International Conference on Software Engineering (ICSE) 2021 , May 20-30, 2021, Madrid, Spain, 10 pages.
Redini et al., "Diane: Identifying Fuzzing Triggers in Apps to Generate Under-constrained Inputs for IoT Devices," 42nd IEEE Symposium on Security and Privacy (S&P) 2021, May 24-27, 2021, 17 pages.
Babic et al., "Fudge: Fuzz Driver Generation at Scale," ESEC/FSE '19, Aug. 26-30, 2019, Tallinn, Estonia, pp. 975-985.
Ispoglou et al., "FuzzGen: Automatic Fuzzer Generation," 29th USENIX Security Symposium, Aug. 12-14, 2020, 17 pages.
Blair et al., "HotFuzz: Discovering Algorithmic Denial of Service Vulnerabilities through Guided Micro-Fuzzing," Network and Distributed Systems Security (NDSS) Symposium 2020, Feb. 23-26, 2020, San Diego, CA, 18 pages.

\* cited by examiner

GUIDED MICRO-FUZZING THROUGH HYBRID PROGRAM ANALYSIS

This invention was made with government support under Contract #W912CG-19-C-0003 awarded by the Defense Advanced Research Projects Agency (DARPA). The government has certain rights in this invention.

BACKGROUND

1. Field:

The disclosure relates generally to fuzz testing and more specifically to providing a root cause context aware micro-fuzzing platform that utilizes binary analysis to detect security bugs in programs and individual libraries.

2. Description of the Related Art:

Fuzz testing or fuzzing is an automated software testing technique that involves providing invalid, unexpected, or random data as inputs to a computer program. The program is then monitored for exceptions, such as, for example, crashes, failing built-in code assertions, memory leaks, and the like. Typically, fuzz generators are used to test programs that take structured inputs. This structure is, for example, specified in a file format or protocol and distinguishes valid from invalid input. A fuzz generator generates inputs that are valid enough in that the inputs are not directly rejected by the parser, but do create unexpected behaviors in the program, and are invalid enough to expose faults that have not been dealt with.

Fuzzing is mostly used to expose vulnerabilities in security-critical programs that may be exploited by a malicious user. In order to expose security bugs, a fuzz generator must be able to distinguish expected (i.e., normal) from unexpected (i.e., buggy) program behavior. To make a fuzz generator more sensitive to faults other than crashes, sanitizers can be used to inject assertions that crash the program when a bug is detected.

SUMMARY

According to one illustrative embodiment, a computer-implemented method for program analysis is provided. A computer generates an intermediate representation of a program. The computer provides a set of structured inputs to the program. The set of structured inputs are derived from the intermediate representation. The computer executes the program using the set of structured inputs. The computer performs a set of action steps in response to observing a violation of a policy during execution of the program using the structured inputs. According to other illustrative embodiments, a computer system and computer program product for program analysis are provided.

DETAILED DESCRIPTION

Figure 1:
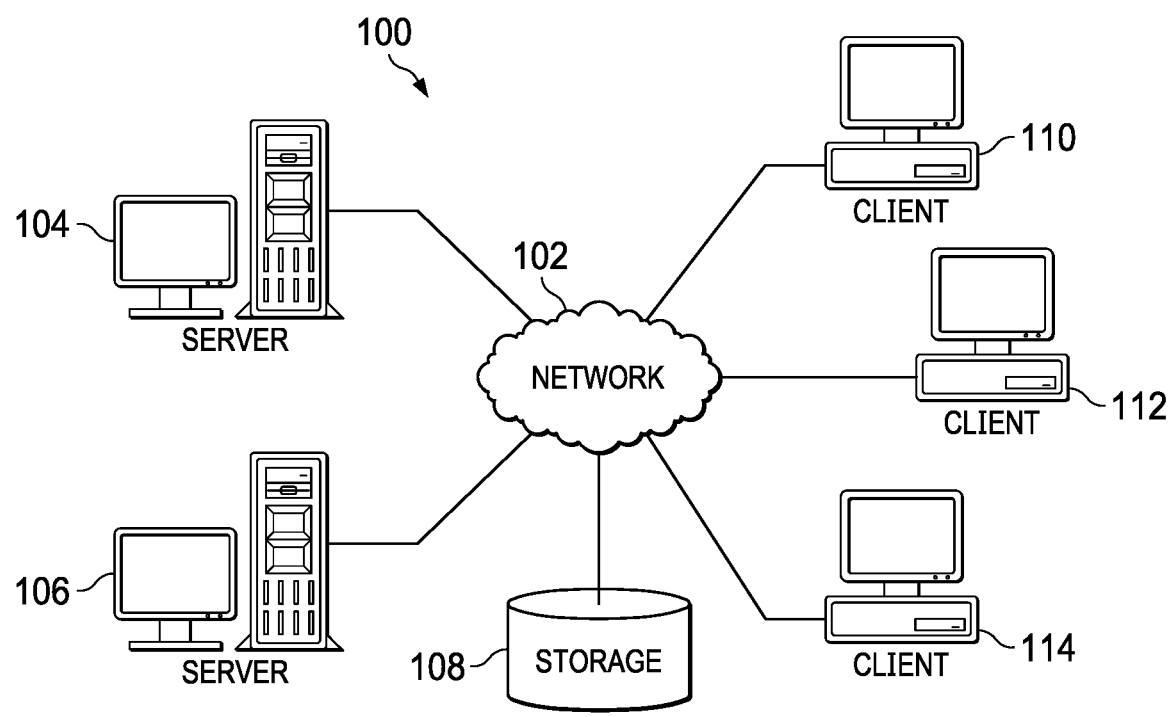
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide program micro-fuzzing services to requesting client device users. Micro-fuzzing is analogous to micro-execution of a program under test for fuzzing a selected set of machine code segments (i.e., micro-programs) of the program under test. The program may be any type of software program or application corresponding to any domain, such as, for example, a business domain, banking domain, financial domain, healthcare domain, insurance domain, educational domain, entertainment domain, governmental domain, or the like.

Server 104 and server 106 generate an intermediate representation of the program under test using binary analysis. Server 104 and server 106 select points in the intermediate representation that represent beginning and ending points of the selected set of code segments within the program under test. In addition, server 104 and server 106 generate structured inputs corresponding to a given state of the program under test for fuzzing the selected set of code segments (micro-programs).

Then, server 104 and server 106 execute the selected set of code segments in the intermediate state using the structured inputs. Server 104 and server 106 monitor execution of the selected set of code segments in the intermediate state to detect security bugs by observing violations of defined security policies. In response to observing a violation, server 104 and server 106 determine a root cause context of the violation by examining information in a core dump, memory dump, crash dump, system dump, or the like. The root cause context of the violation may include, for example, the specific program function and location of the violation in the program under test. Further, server 104 and server 106 perform a set of action steps for fixing a detected security bug based on the root cause context of the violation. The set of action steps may include at least one of sending a notification regarding the security bug to a program analyst or developer, recommending a software patch for the program under test to fix the security bug, automatically applying the software patch to the program under test, preventing deployment of the program until the security bug is resolved, or the like.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 request the program micro-fuzzing services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, programs, core dumps, security policies, historic micro-fuzzing data, and the like. Furthermore, storage 108 may store other types of data, such as authentication or credential data that may include usernames, passwords, and the like associated with, for example, client device users, program analysts, program developers, system administrators, and the like.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
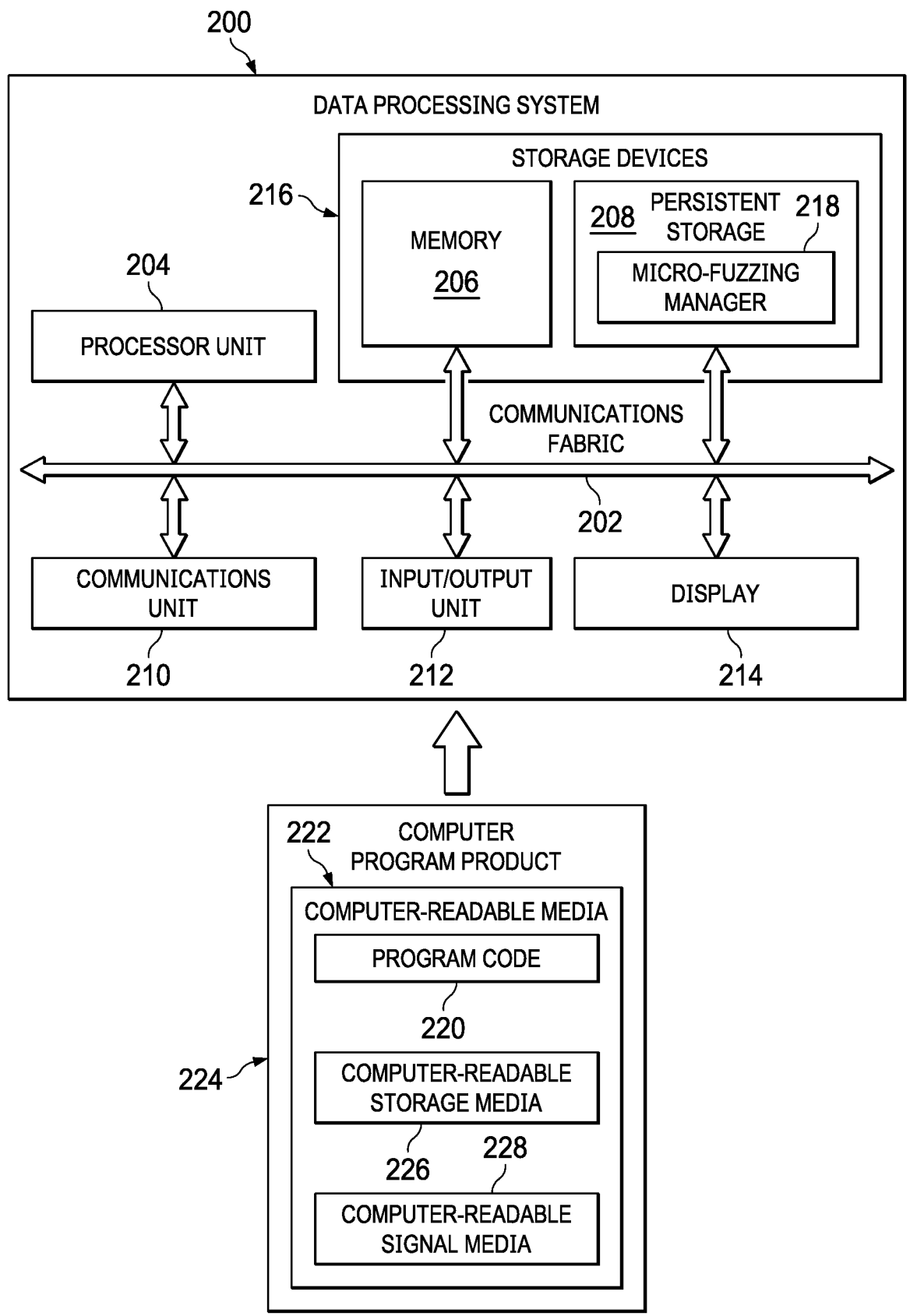
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or server 106 in FIG. 1, in which computer-readable program code or instructions implementing the program micro-fuzzing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores micro-fuzzing manager 218. However, it should be noted that even though micro-fuzzing manager 218 is illustrated as residing in persistent storage 208, in an alternative illustrative embodiment, micro-fuzzing manager 218 may be a separate component of data processing system 200. For example, micro-fuzzing manager 218 may be a hardware component coupled to communication fabric 202 or a combination of hardware and software components. In another alternative illustrative embodiment, a first set of components of micro-fuzzing manager 218 may be located in data processing system 200 and a second set of components of micro-fuzzing manager 218 may be located in a second data processing system, such as, for example, server 106 in FIG.

1. In yet another alternative illustrative embodiments, micro-fuzzing manager 218 may be located in a client device, such as, for example, client 110 in FIG. 1, instead of, or in addition to, data processing system 200.

Micro-fuzzing manager 218 controls the process of fuzzing one or more code segments (i.e., micro-programs) in an intermediate representation of a program under test using a binary analysis framework to detect security bugs in the program under test by observing security violation of defined security policies during execution of the code segments in the intermediate representation. As a result, data processing system 200 operates as a special purpose computer system in which micro-fuzzing manager 218 in data processing system 200 enables detection of security bugs in programs under test by observing violations of security policies during execution of the programs under test. In particular, micro-fuzzing manager 218 transforms data processing system 200 into a special purpose computer system as compared to currently available general computer systems that do not have micro-fuzzing manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Fuzz testing of a program repeatedly barrages the program with random inputs in the hope of crashing the program and finding software bugs in the program. Over the past several decades, this fuzz testing technique has a proven track record for finding security vulnerabilities in programs that go undetected during the software development life-cycle.

Current fuzz testing frameworks use compiler instrumentation to insert sanitizers that cause a program under test to crash when an input causes the program under test to violate, for example, a defined security policy, such as writing past a boundary of a buffer, writing to a dangling pointer, tripping over a race condition, or the like. In addition to sanitizing program execution, compiler instrumentation also provides a fuzz generator with visibility into areas of a program's control flow graph that the fuzz generator successfully executes.

Although it is now considered good practice to incorporate this offline analysis into the software development life-cycle, certain types of fuzzers work best when given access to source code and are applied to whole programs that receive files. Currently, fuzz testing individual code segments of a program requires manual effort to define a test harness around the program under test that translates the flat bitmaps understood by the fuzz generator into inputs understood by the program under test. A test harness is a collection of software and test data configured to test a program by running the program under varying conditions and monitoring its behavior and outputs. Such a test harness can be authored manually by an expert program analyst who understands the domain of the program under test or can be generated by a framework that attempts to automatically infer the inputs of the program under test. The former is most likely to generate quality test harnesses that allow the fuzzer to detect possible software bugs in the program under test, while the latter provides an opportunity to detect program vulnerabilities at scale with decreased human effort.

While recent work supports fuzz testing program code at scale by automatically generating test harnesses through fuzz generators, such systems suffer from the difficulty of automatically inferring the domain of complex programs without human insight. Static analysis of programs that use a given program under test can provide insights to a fuzz generator on how to generate a realistic test harness. In dynamic programming languages, simply introspecting the program's environment through reflection is enough to generate realistic inputs for the program under test. Although these approaches show the potential of scaling fuzz testing, these approaches primarily work by inferring information available outside the program under test. Binary analysis tools, which attempt to automatically reverse-engineer properties of whole programs, can provide a wealth of information to a fuzz generator. In contrast to other static analyses, which may require access to source code or an intermediate representation, such as compiler bitcode for a program under test, binary analysis tools only require the same machine code that power production services and interact with users (e.g., customers).

This makes binary analysis tools ideal for fuzzing programs at scale, without interfering with the software development life-cycle.

Illustrative embodiments provide a root cause context aware micro-fuzzing environment that utilizes binary code analysis to detect software bugs in programs and individual libraries. A software bug is an error, flaw, or fault in a program that causes the program to produce an incorrect or unexpected result, or to behave in unintended ways. Most software bugs arise from mistakes and errors made in either a program's design or its source code. A few bugs are caused by compilers producing incorrect code. Other bugs are caused by malicious users introducing malicious code into programs.

Micro-fuzzing is a technique analogous to micro-execution for selectively fuzzing specific machine code segments of a given program without the need to manually define test harnesses around the program under test. Illustrative embodiments utilize a binary analysis framework to lift machine code of a given program into a higher level of abstraction that permits both analysis for inferring proper inputs to selected machine code segments of that program and executing the selected machine code segments without manually constructing a test harness that takes the form of a standalone program. At a high level, the root cause context aware micro-fuzzing environment of illustrative embodiments first lifts selected machine code segments of the program under test into an intermediate representation that allows the binary analysis framework to introspect the program under test. An intermediate representation is code used internally by a compiler to represent the source code and is designed for further processing. An intermediate representation should be capable of representing the source code without loss of information and independent of any particular source language.

Binary code is the fundamental form of the programming data that is directly interpreted by a computer. Binary code is composed of a string of zeros and ones and is ordered and structured in a way that can be read and executed as part of a larger computer program. Binary code is a product of a multistage compilation process that translates source code written in a high-level programming language into machine code specific to the processor architecture on which the computer program is executed. A binary program is a pre-compiled, pre-linked program that is ready to run under a given operating system.

Binary analysis or binary code analysis is associated with software security because binary analysis discovers, for example, vulnerabilities introduced in compilation processes; common weaknesses such as structured query language injection, cross-site scripting, and buffer overflows; malicious content such as backdoors and rootkits that were added without the program developer's knowledge; and the like. Binary analysis is a type of code review that looks at files composed of binary code and assesses their content and structure, all without the need for access to source code. Binary analysis attempts to generate a model of data flows, data types, and control paths of the program under test. The binary analysis framework of illustrative embodiments then analyzes that model to detect any recognizable security flaws or vulnerabilities in the program under test and then output the findings in a vulnerability report to a user, such as a program analyst or program developer.

The root cause context aware micro-fuzzing environment of illustrative embodiments takes the same binary programs users rely on in production services as input and lifts these binary programs into a higher level of abstraction (e.g., intermediate representation), which supports the precision-guided micro-fuzzing of illustrative embodiments. This precision-guided micro-fuzzing of illustrative embodiments is in contrast to current fuzz generators, which attempt to generate valid test harnesses in the form of standalone programs that attempt to invoke the program under tests directly. Instead, the root cause context aware micro-fuzzing environment of illustrative embodiments lifts the program under test directly into the binary analysis framework where micro-fuzzing occurs in an analysis environment that mimics a real process address space.

After the binary analysis framework of illustrative embodiments lifts the program under test into its intermediate representation, the binary analysis framework can begin micro-fuzzing the intermediate representation of the program under test. The binary analysis framework can utilize an emulator that allows the binary analysis framework to execute a set of selected code segments of the program under test in the intermediate representation. This emulator has full visibility in the lifted intermediate representation of the program under test and the binary analysis framework can utilize the emulator to maintain visibility into which portions of the program under test the binary analysis framework has successfully executed and whether the program under test violates any security relevant invariants (e.g., defined security policies), such as, for example, writing past the boundary of a buffer on the stack, writing into a dangling pointer, or consuming more memory than predicted by a static analysis over the program's intermediate representation.

Instead of fuzzing a heavily instrumented program under test contained in a test harness generated by a fuzz generator, illustrative embodiments allow the binary analysis framework to detect software bugs by fuzzing between a selected pair of points (e.g., a selected machine code segment) in the lifted intermediate representation of the program under test. Given that the binary analysis framework, using the intermediate representation and emulator, has full visibility into the program under test's execution when a violation occurs, the binary analysis framework can provide a context of the violation, which identifies a root cause of the violation, to a user, such as, for example, a program analyst, program developer, or the like.

It should be noted that the root cause context aware micro-fuzzing environment of illustrative embodiments can provide such details without modifying the program under test in any way (e.g., without instrumenting the program). This allows the root cause context aware micro-fuzzing environment of illustrative embodiments to analyze the same binaries deployed to cloud services (e.g., microservices) and to end users (e.g., customers). This binary code analysis of illustrative embodiments enables a root cause analysis, where an input causes a crash in a production service or environment, illustrative embodiments can perform micro-fuzzing of an individual method (e.g., a code segment between selected points in the intermediate representation of the program under test) contained in a core dump to reveal the root cause of the violation. The core dump can consist of, for example, recorded state of the working memory of the program at the specific time of the violation, which is generally when the program crashed or otherwise terminated abnormally. In addition, the core dump can include other pieces of program state that are usually dumped at the same time, including processor registers, which may include the program counter and stack pointer, memory management information, and other processor and operating system flags and information.

The root cause context aware micro-fuzzing environment of illustrative embodiments basically consists of two parts. First, the binary analysis framework of illustrative embodiments lifts the program under test into an intermediate representation. Programs under test that illustrative embodiments consider for micro-fuzzing are either whole programs or library dependencies. In either case, the binary analysis framework lifts executables that contain selected machine code segments in a given instruction set architecture. An instruction set architecture is an abstract model of a computer. For example, illustrative embodiments may lift a program under test given in executable and linkable format files that contain machine code for a given computer architecture. The executable and linkable format is a standard file format for executable files, object code, shared libraries, and core dumps.

Second, after the binary analysis framework has a given program under test in an intermediate representation form, the binary analysis framework begins micro-fuzzing the program under test between selected points (e.g., one or more selected machine code segments in the intermediate representation of the program under test). A user, such as, for example, a program analyst, program developer, or the like, may manually select the points or code segments the binary analysis framework is to micro-fuzz. Alternatively, the binary analysis framework may automatically select the points or code segments to micro-fuzz based on, for example, machine learning, historic micro-fuzzing data, or the like. It should be noted that the micro-fuzzing of illustrative embodiments can be understood as an application of micro-execution for the purpose of detecting security bugs in programs under tests. Therefore, a micro-execution framework can be altered for the purpose of vulnerability detection in the program under test.

Given the ability of illustrative embodiments to execute a set of selected code segments of the program under test, the binary analysis framework determines a program state that represents structured inputs for fuzzing the set of selected code segments. The structured inputs can be specified in a file format that distinguishes valid from invalid inputs for micro-fuzzing. A strategy of illustrative embodiments is to maximize code coverage of the program under test and sanitize execution with respect to security policies of interest. For example, illustrative embodiments can take the machine state from core dumps generated by production services and copy the machine state into the binary analysis framework to form the structured inputs for micro-fuzzing. Alternatively, illustrative embodiments may utilize random inputs or empty seed inputs for registers and memory at the expense of introducing false positives into the results.

After the binary analysis framework generates the structured inputs, a micro-fuzzer of the binary analysis framework repeatedly invokes the program under test in order to maximize the amount of code executed and observe any violation, which serves as evidence of a security bug in the program under test. Current fuzzers employ techniques inspired by genetic algorithms to evolve program inputs, represented as flat bitmaps, to maximize the amount of code executed by a program under test. In a micro-fuzzing environment, where the inputs to a given program under test consist of an operating system process address space and machine registers, treating the entire machine state as one flat bitmap may not be practical. Therefore, the binary analysis framework of illustrative embodiments intelligently mutates and crosses over machine state, including registers and regions of memory, by utilizing the context available in the intermediate representation to recognize and directly alter program structures such as C structs or C++ objects. A baseline implementation of the binary analysis framework can simply treat each register and memory region as a bitmap and employ techniques used by existing fuzzers.

Upon the micro-fuzzer of the binary analysis framework successfully executing the program under test, the micro-fuzzer sanitizes the execution of the program under test to detect security bugs. The micro-fuzzer has full visibility into the program under test and its execution and can alter both the intermediate representation and flow of execution of the program under test to support its analysis. The micro-fuzzer can sanitize execution by observing the program under test violate security relevant invariants. For example, if the program under test writes past the amount of space designated for a stack frame, then the binary analysis framework can detect this security relevant invariant violation by consulting the intermediate representation and output the violation as evidence of a buffer overflow bug contained within the program under test. It should be noted that the micro-fuzzer's ability to sanitize execution is not limited to static analysis over the program under test. For example, the micro-fuzzer can record all pointers freed during execution in order to detect any writes to dangling pointers during fuzzing.

Thus, illustrative embodiments provide one or more technical solutions that overcome a technical problem with fuzzing specific machine code segments of a given program without the need to manually define test harnesses around the program under test. As a result, these one or more technical solutions provide a technical effect and practical application in the field of program analysis.

Figure 3:
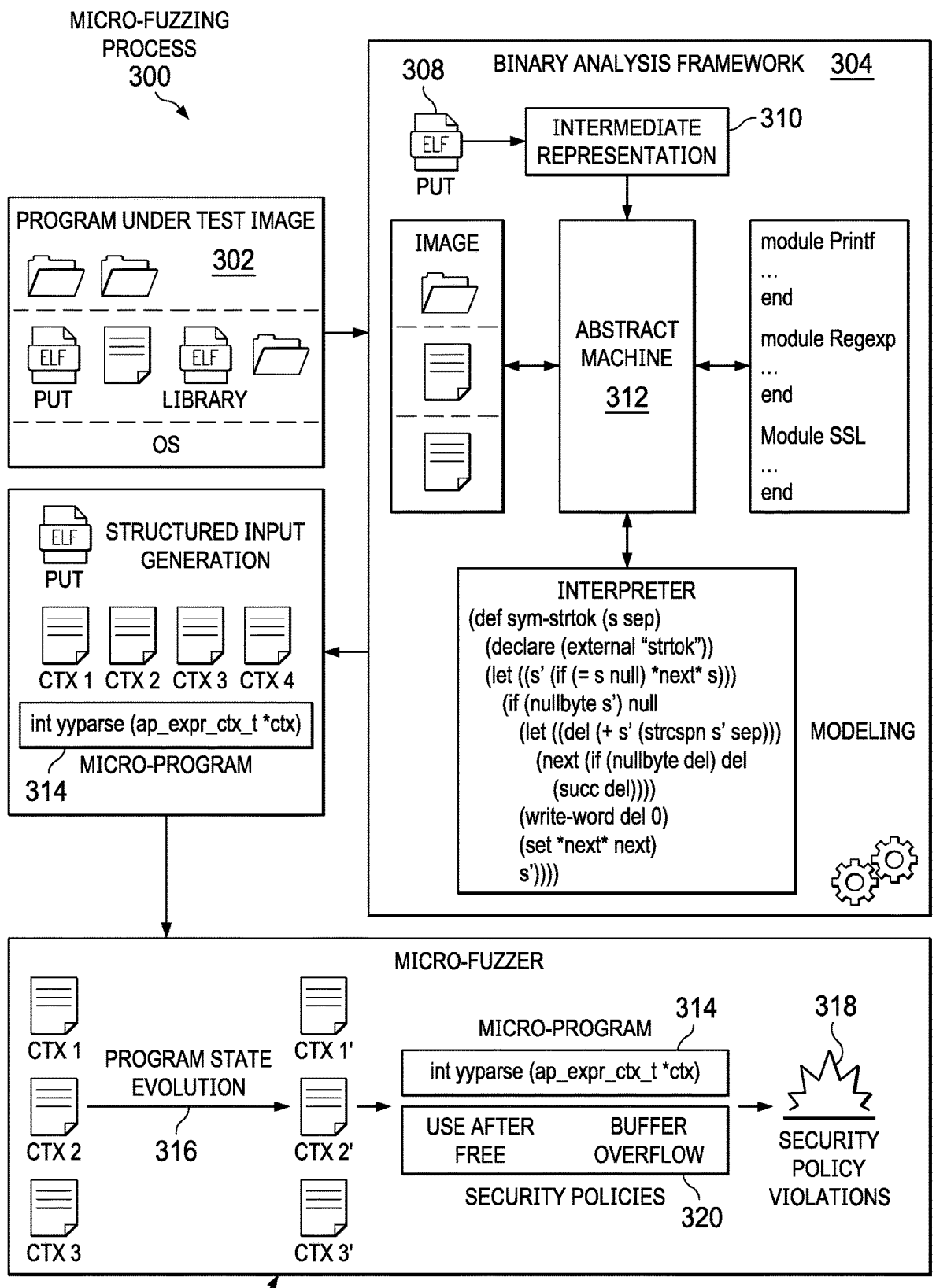
FIG. 3 is a diagram illustrating an example of a micro-fuzzing process in accordance with an illustrative embodiment.

With reference now to FIG. 3, a diagram illustrating an example of a micro-fuzzing process is depicted in accordance with an illustrative embodiment. Micro-fuzzing process 300 may be implemented in a computer, such as, for example, server 104 or server 106 in FIG. 1 or data processing system 200 in FIG. 2.

In this example, micro-fuzzing process 300 includes program under test image 302, binary analysis framework 304, and micro-fuzzer 306. Program under test image 302 may include, for example, the program under test (PUT) and its library, operating system, data files, and the like. Binary analysis framework 304 receives program under test image 302 for micro-fuzzing program under test 308. Program under test 308 may be, for example, in an executable and linkable format (ELF).

Binary analysis framework 304 generates intermediate representation 310 of executable machine code of program under test 308 using binary analysis. Binary analysis framework 304 places intermediate representation 310 in abstract machine 312 (e.g., an instruction set architecture). In addition, binary analysis framework 304 selects a pair of points in intermediate representation 310 of program under test 308 to test for violations of defined security policies. In this example, the pair of points marks a beginning and an end of micro-program 314 (e.g., a specific machine code segment) in intermediate representation 310 of program under test 308. Further, binary analysis framework 304 generates a set of structured inputs corresponding to a given state of program under test 308 for fuzzing micro-program 314 in intermediate representation 310 of program under test 308.

Binary analysis framework 304 utilizes micro-fuzzer 306 to execute micro- program 314 in intermediate representation 310 based on the generated set of structured inputs corresponding to the given state of program under test 308. Micro-fuzzer 306 performs program state evolution 316 of the given program state while executing intermediate representation 310 of program under test 308 using the set of structured inputs. Micro-fuzzer 306 monitors the execution of micro-program 314 in intermediate representation 310 to detect potential security bugs by observing security policy violations 318 of security policies 320. In response to observing a violation, micro-fuzzer 306 determines a root cause context of the violation by examining a core dump. Afterward, micro-fuzzer 306 sends the root cause context of the violation to a user for fixing the detected security bug.

Figure 4:
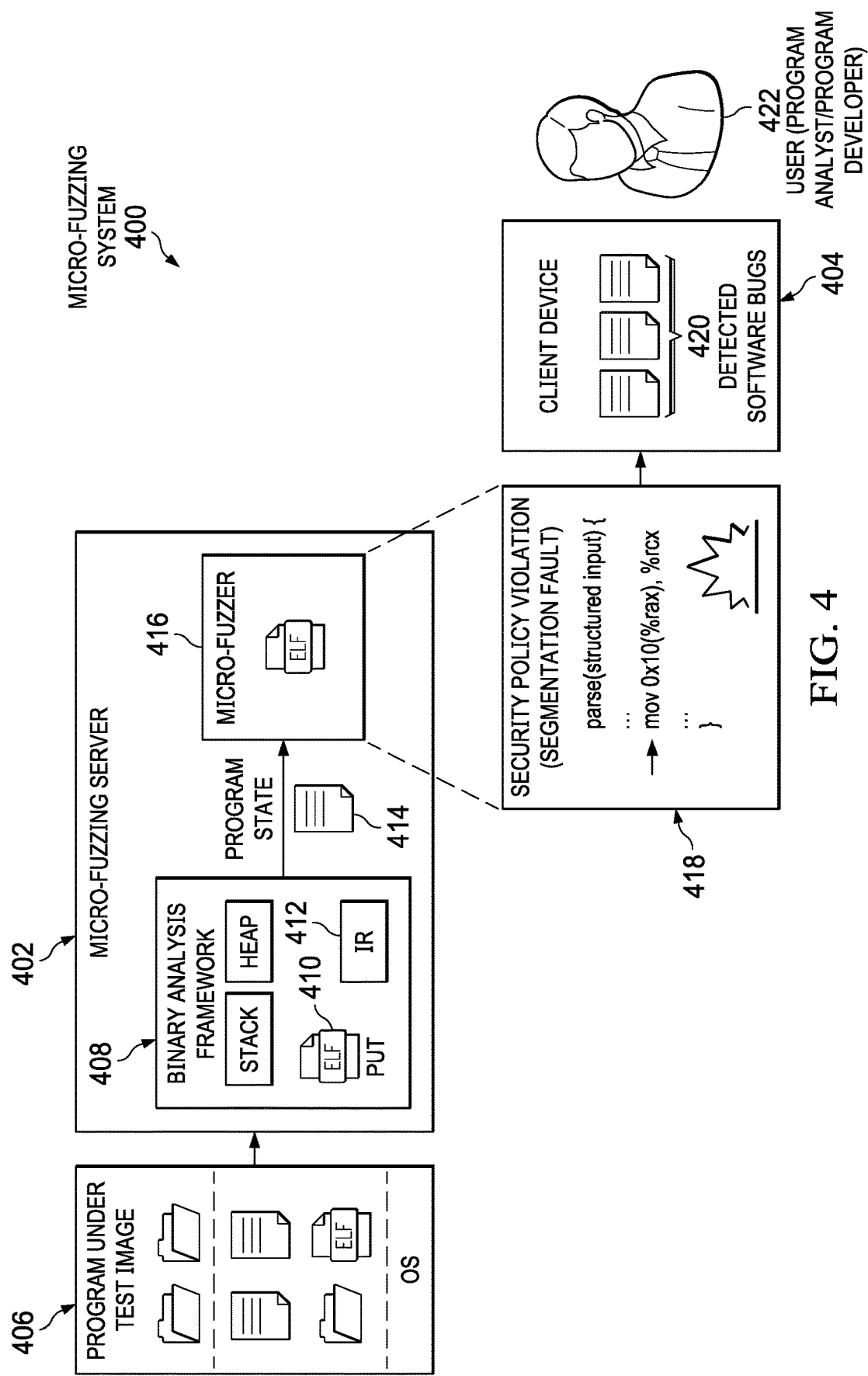
FIG. 4 is a diagram illustrating an example of a micro-fuzzing system in accordance with an illustrative embodiment.

With reference now to FIG. 4, a diagram illustrating an example of a micro- fuzzing system is depicted in accordance with an illustrative embodiment. Micro-fuzzing system 400 may be implemented in a network of data processing systems, such as, for example, network data processing system 100 in FIG. 1.

In this example, micro-fuzzing system 400 includes micro-fuzzing server 402 and client device 404. Micro-fuzzing server 402 may be, for example, server 104 or server 106 in FIG. 1 or data processing system 200 in FIG. 2. Client device 404 may be, for example, client 110, client 112, or client 114 in FIG. 1. However, it should be noted that micro-fuzzing system 400 is intended as an example only and may include any number of micro-fuzzing servers and client devices.

Micro-fuzzing server 402 receives program under test image 406, such as, for example, program under test image 302 in FIG. 3. Micro-fuzzing server 402 utilizes binary analysis framework 408, such as, for example, binary analysis framework 304 in FIG. 3, to lift machine code of program under test 410 into intermediate representation (IR) 412. Binary analysis framework 408 derives program state 414 from intermediate representation 412.

Micro-fuzzing server 402 utilizes micro-fuzzer 416, such as, for example, micro-fuzzer 306 in FIG. 3, to execute intermediate representation 412 of program under test 410 using a set of structured inputs corresponding to program state 414. Micro-fuzzer 416 observes security policy violation 418 during execution of intermediate representation 412 of program under test 410. In this example, security policy violation 418 is a segmentation fault. However, it should be noted that the segmentation fault is intended as an example only and not as a limitation on illustrative embodiments. In other words, security policy violation 418 may be any type of violation corresponding to a particular security policy. Micro-fuzzing server 402 sends detected software bugs 420, which correspond to security policy violation 418, to user 422 via client device 404. User 422 may be, for example, a program analyst or program developer.

Figure 5:
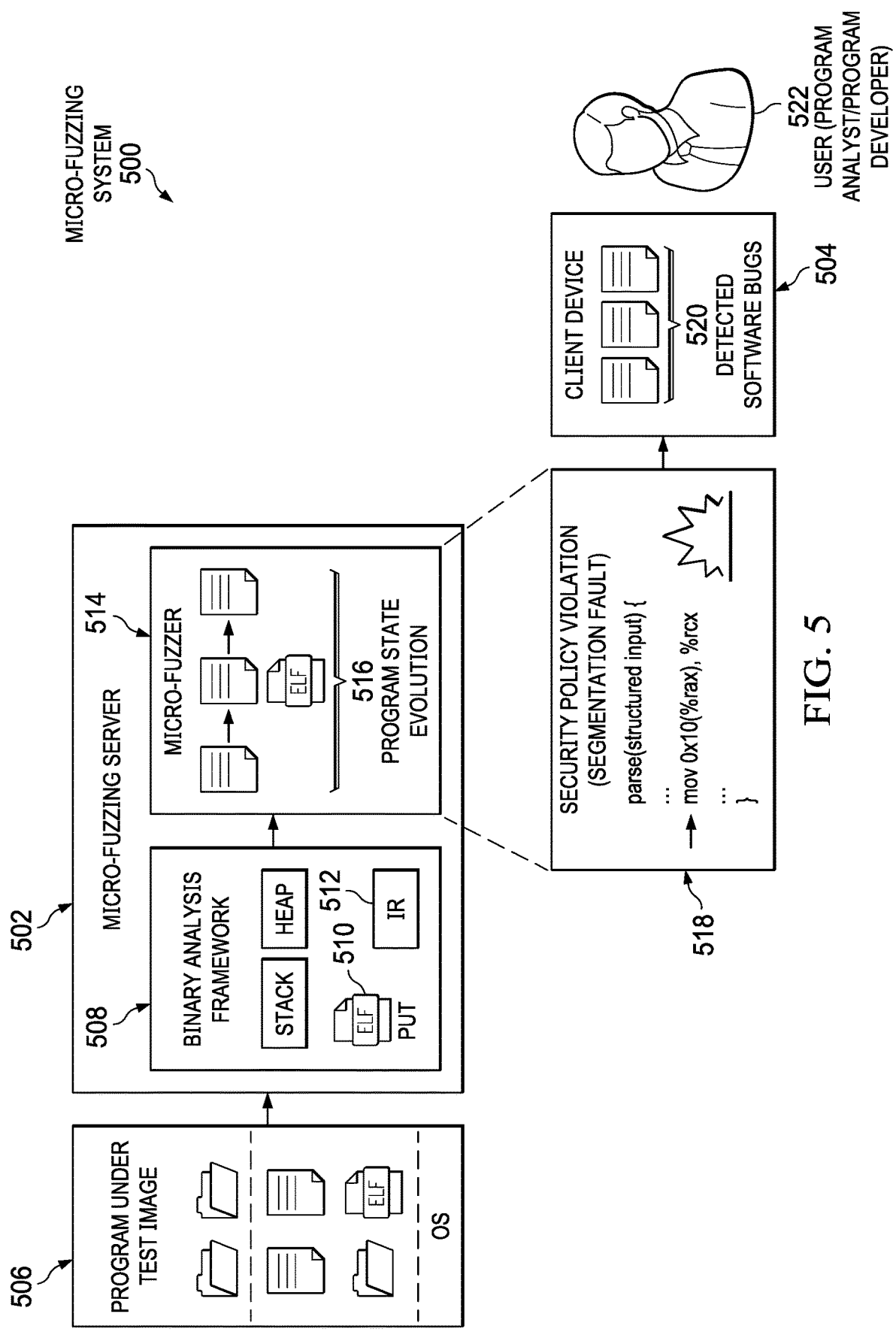
FIG. 5 is a diagram illustrating an example of an alternative micro-fuzzing system in accordance with an illustrative embodiment.

With reference now to FIG. 5, a diagram illustrating an example of an alternative micro-fuzzing system is depicted in accordance with an illustrative embodiment. Micro-fuzzing system 500 may be implemented in a network of data processing systems, such as, for example, network data processing system 100 in FIG. 1.

Micro-fuzzing system 500 is similar to micro-fuzzing system 400 in FIG. 4. For example, micro-fuzzing system 500 includes micro-fuzzing server 502 and client device 504, such as, for example, micro-fuzzing server 402 and client device 404 in FIG. 4. Micro-fuzzing server 502 receives program under test image 506, such as, for example, program under test image 406 in FIG. 4. Micro-fuzzing server 502 utilizes binary analysis framework 508, such as, for example, binary analysis framework 408 in FIG. 4, to lift machine code of program under test 510 into intermediate representation (IR) 512. Binary analysis framework 508 derives a program state, such as, for example, program state 414 in FIG. 4, from intermediate representation 512.

Micro-fuzzing server 502 utilizes micro-fuzzer 514 to execute intermediate representation 512 of program under test 510 using a set of structured inputs corresponding to the derived program state. Micro-fuzzer 514 performs program state evolution 516 of the derived program state while executing intermediate representation 412 of program under test 410 using the set of structured inputs. Micro-fuzzer 514 observes security policy violation 518 during execution of intermediate representation 512 of program under test 510.

Micro-fuzzing server 502 sends detected software bugs 520, which correspond to security policy violation 518, to user 522 via client device 504.

Figure 6A:
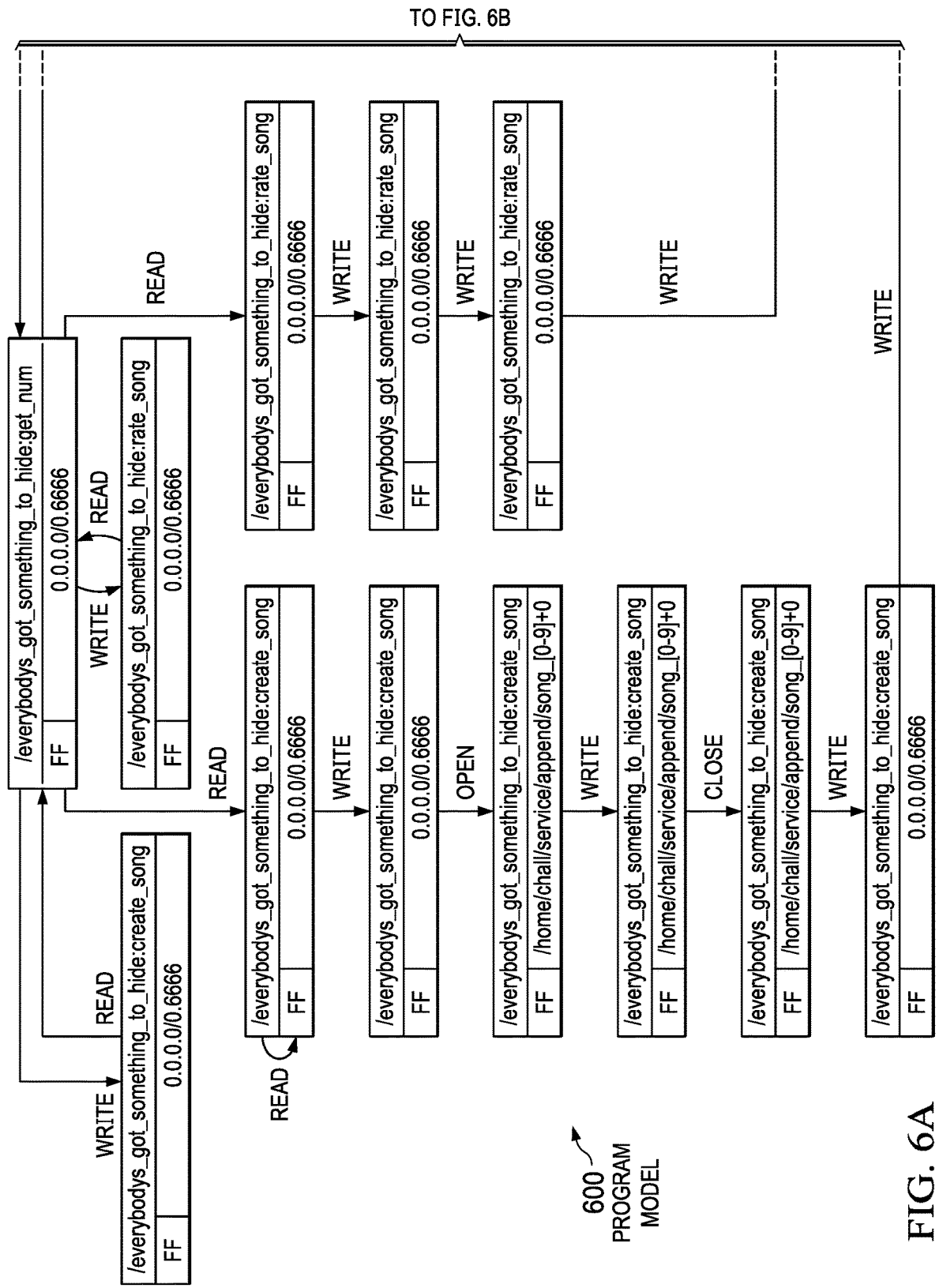
FIGS. 6A-6B are a diagram illustrating an example of a program model in accordance with an illustrative embodiment.
Figure 6B:
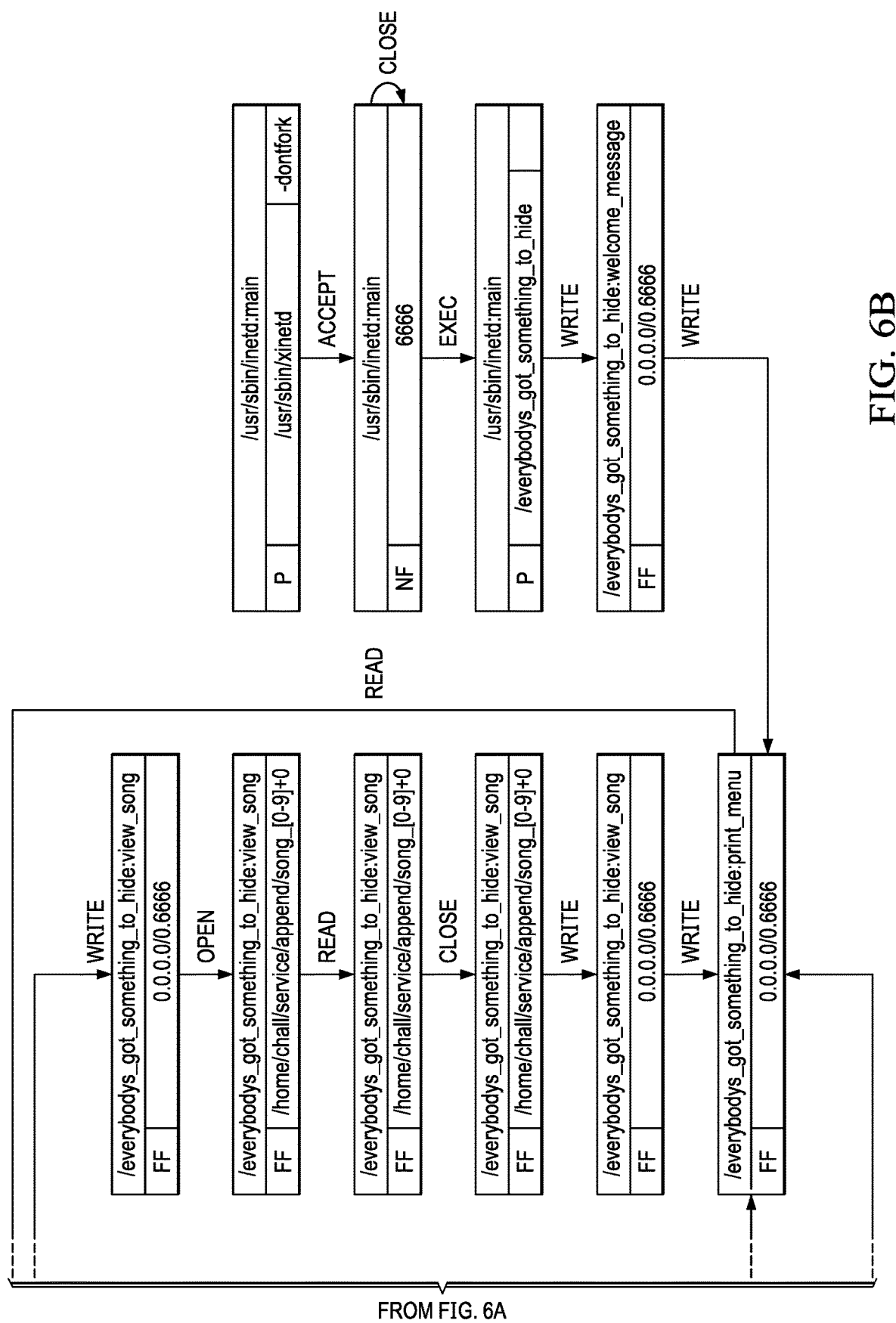

With reference now to FIGS. 6A-6B, a diagram illustrating an example of a program model is depicted in accordance with an illustrative embodiment. Program model 600 is a specific example of a model for a program under test, such as, for example, program under test 308 in FIG. 3. However, it should be noted that program model 600 is intended as an example only and not as a limitation on illustrative embodiments. In other words, illustrative embodiments may utilize any type of program model.

In this example, program model 600 annotates and tracks program function names and debug symbols. Given a selected target node (e.g., function, executable machine code segment, or the like) in program model 600, a micro-fuzzing manager, such as, for example, micro-fuzzing manager 218 in FIG. 2, can walk over predecessor nodes of the selected target node to determine a given state of the program under test, such as, for example, program state 414 in FIG. 4, to micro-fuzz the target node and generate a diverse set of structured inputs. Thus, the micro-fuzzing manager can micro-execute the program under test at the selected target node in program model 600 using the diverse set of structured inputs corresponding to the given state of the program under test.

Figure 7:
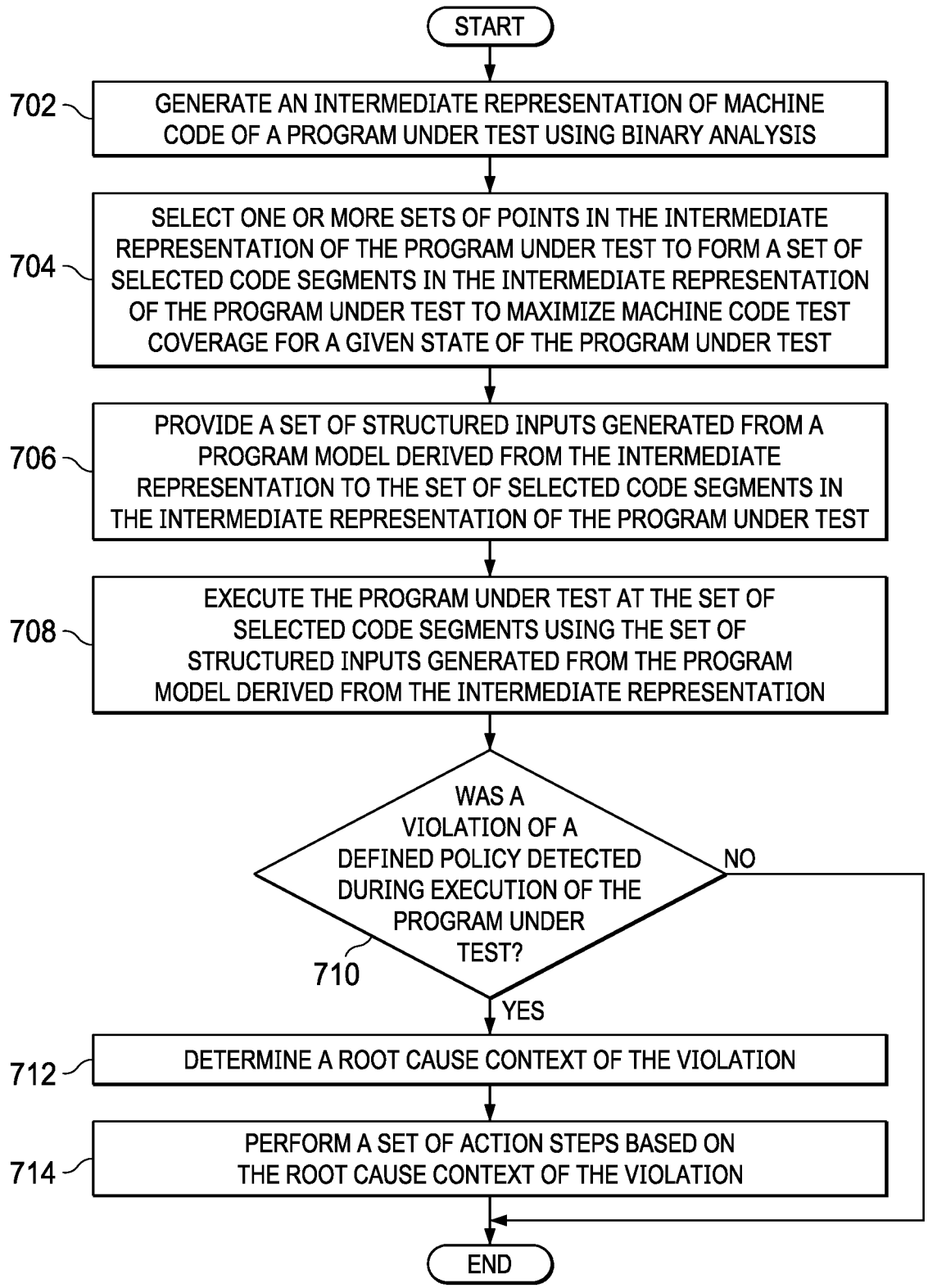
FIG. 7 is a flowchart illustrating a process for program analysis in accordance with an illustrative embodiment.

With reference now to FIG. 7, a flowchart illustrating a process for program analysis is shown in accordance with an illustrative embodiment. The process shown in FIG. 7 may be implemented in a computer, such as, for example, server 104 in FIG. 1, data processing system 200 in FIG. 2, micro-fuzzing server 402 in FIG. 4, or micro-fuzzing server 502 in FIG. 5. For example, the process shown in FIG. 7 may be implemented in micro-fuzzing manager 218 in FIG. 2.

The process begins when the computer generates an intermediate representation of machine code of a program under test using binary analysis of the program under test (step 702). The intermediate representation of the machine code is in a format allowing introspection of the program under test. The computer selects one or more sets of points in the intermediate representation of the program under test to form a set of selected code segments in the intermediate representation of the program under test to maximize machine code test coverage for a given state of the program under test (step 704). One set of points includes a beginning point and an end point of one particular code segment in the intermediate representation of the program under test.

The computer provides a set of structured inputs generated from a program model derived from the intermediate representation to the set of selected code segments in the intermediate representation of the program under test (step 706). The computer executes the program under test at the set of selected code segments using the set of structured inputs generated from the program model derived from the intermediate representation (step 708).

The computer makes a determination as to whether a violation of a defined policy was detected during execution of the program under test using the structured inputs (step 710). If the computer determines that a violation of a defined policy was not detected during execution of the program under test using the structured inputs, no output of step 710, then the process terminates thereafter. If the computer determines that a violation of a defined policy was detected during execution of the program under test using the structured inputs, yes output of step 710, then the computer determines a root cause context of the violation (step 712). In addition, the computer performs a set of action steps based on the root cause context of the violation (step 714). The set of action steps includes at least one of sending a list of detected software bugs to a user (e.g., program analyst, program developer, or the like) for fixing, opening a ticket for bug correction identifying the root cause context of the violation, recommending a set of patches for the detected bugs, preventing the program from being deployed prior to the detected bugs being fixed, and the like. Thereafter, the process terminates.

Figure 8:
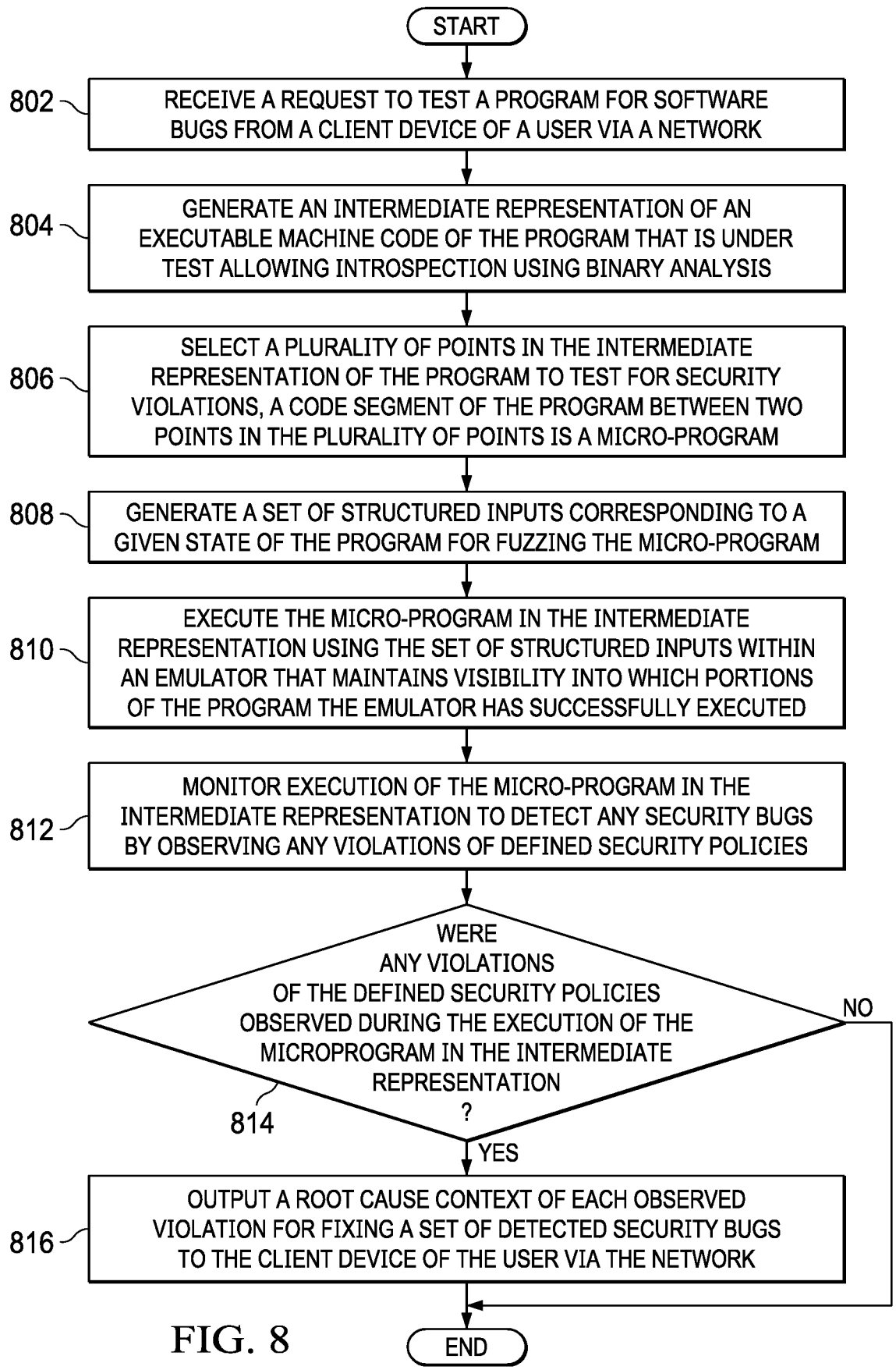
FIG. 8 is a flowchart illustrating a process for micro-fuzzing a program in accordance with an illustrative embodiment.

With reference now to FIG. 8, a flowchart illustrating a process for micro-fuzzing a program is shown in accordance with an illustrative embodiment. The process shown in FIG. 8 may be implemented in a computer, such as, for example, server 104 in FIG. 1, data processing system 200 in FIG. 2, micro-fuzzing server 402 in FIG. 4, or micro-fuzzing server 502 in FIG. 5. For example, the process shown in FIG. 8 may be implemented in micro-fuzzing manager 218 in FIG. 2.

The process begins when the computer receives a request to test a program for software bugs from a client device of a user via a network (step 802). In response to receiving the request to test the program for software bugs, the computer generates an intermediate representation of an executable machine code of the program that is under test allowing introspection using binary analysis (step 804). In addition, the computer selects a plurality of points in the intermediate representation of the program to test for security violations (step 806). A code segment of the program between two points in the plurality of points is a micro-program.

Further, the computer generates a set of structured inputs corresponding to a given state of the program for fuzzing the micro-program (step 808). The computer executes the micro-program in the intermediate representation using the set of structured inputs within an emulator that maintains visibility into which portions of the program the emulator has successfully executed (step 810). The computer monitors execution of the micro-program in the intermediate representation to detect any security bugs by observing any violations of defined security policies (step 812).

The computer makes a determination as to whether any violations of the defined security policies were observed during the execution of the micro-program in the intermediate representation (step 814). If the computer determines that no violations of the defined security policies were observed during the execution of the micro-program in the intermediate representation, no output of step 814, then the process terminates thereafter. If the computer determines that one or more violations of the defined security policies were observed during the execution of the micro-program in the intermediate representation, yes output of step 814, then the computer outputs a root cause context of each observed violation for fixing a set of detected security bugs to the client device of the user via the network (step 816). Thereafter, the process terminates.

Thus, illustrative embodiments of the present invention provide a computer-implemented method, computer system, and computer program product for providing a root cause context aware micro-fuzzing platform that utilizes binary analysis to detect security bugs in programs and individual libraries. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for program analysis, the computer-implemented method comprising:
generating, by a computer, an intermediate representation of a program;
providing, by the computer, a set of structured inputs to the program, the set of structured inputs derived from the intermediate representation;
executing, by the computer, the program using the set of structured inputs; and
performing, by the computer, a set of action steps in response to observing a violation of a policy during execution of the program using the structured inputs.

2. The computer-implemented method of claim 1 further comprising:
selecting, by the computer, a set of points in the intermediate representation of the program to form a selected code segment in the intermediate representation of the program to maximize coverage for a given state of the program.

3. The computer-implemented method of claim 2, wherein the set of points in the intermediate representation of the program are selected for detection of vulnerabilities in the program.

4. The computer-implemented method of claim 2 further comprising:
providing, by the computer, the set of structured inputs that were generated from a model derived from the intermediate representation to the selected code segment in the intermediate representation of the program; and
executing, by the computer, the program at the selected code segment using the set of structured inputs generated from the model derived from the intermediate representation.

5. The computer-implemented method of claim 4 further comprising:
determining, by the computer, whether the violation of the policy was detected during execution of the program using the structured inputs; and
responsive to the computer determining that the violation of the policy was detected during execution of the program using the structured inputs, determining, by the computer, a root cause context of the violation of the policy and performing, by the computer, the set of action steps based on the root cause context of the violation of the policy.

6. The computer-implemented method of claim 1 further comprising:
monitoring, by the computer, execution of the program in the intermediate representation to detect any security bugs by observing any violations of defined security policies.

7. The computer-implemented method of claim 1 further comprising:
outputting, by the computer, a root cause context of the violation of the policy for fixing a detected security bug to a client device of a user via a network.

8. The computer-implemented method of claim 1, wherein the computer generates the intermediate representation of the program using binary analysis of the program, the intermediate representation in a format allowing introspection of the program.

9. A computer system for program analysis, the computer system comprising:
a bus system;
a storage device connected to the bus system, wherein the storage device stores program instructions; and
a processor connected to the bus system, wherein the processor executes the program instructions to:
generate an intermediate representation of a program;
provide a set of structured inputs to the program, the set of structured inputs derived from the intermediate representation;
execute the program using the set of structured inputs; and
perform a set of action steps in response to observing a violation of a policy during execution of the program using the structured inputs.

10. The computer system of claim 9, wherein the processor further executes the program instructions to:
select a set of points in the intermediate representation of the program to form a selected code segment in the intermediate representation of the program to maximize coverage for a given state of the program.

11. The computer system of claim 10, wherein the set of points in the intermediate representation of the program are selected for detection of vulnerabilities in the program.

12. The computer system of claim 10, wherein the processor further executes the program instructions to:
provide the set of structured inputs that were generated from a model derived from the intermediate representation to the selected code segment in the intermediate representation of the program; and
execute the program at the selected code segment using the set of structured inputs generated from the model derived from the intermediate representation.

13. The computer system of claim 12, wherein the processor further executes the program instructions to:
determine whether the violation of the policy was detected during execution of the program using the structured inputs; and
determine a root cause context of the violation of the policy and perform the set of action steps based on the root cause context of the violation of the policy in response to determining that the violation of the policy was detected during execution of the program using the structured inputs.

14. The computer system of claim 9, wherein the processor further executes the program instructions to:
monitor execution of the program in the intermediate representation to detect any security bugs by observing any violations of defined security policies.

15. A computer program product for program analysis, the computer program product comprising a computer-readable storage medium having program instructions embodied therewith, the program instructions executable by a computer to cause the computer to perform a method of:
generating, by the computer, an intermediate representation of a program;
providing, by the computer, a set of structured inputs to the program, the set of structured inputs derived from the intermediate representation;
executing, by the computer, the program using the set of structured inputs; and
performing, by the computer, a set of action steps in response to observing a violation of a policy during execution of the program using the structured inputs.

16. The computer program product of claim 15 further comprising:

selecting, by the computer, a set of points in the intermediate representation of the program to form a selected code segment in the intermediate representation of the program to maximize coverage for a given state of the program.

17. The computer program product of claim 16, wherein the set of points in the intermediate representation of the program are selected for detection of vulnerabilities in the program.

18. The computer program product of claim 16 further comprising:
   providing, by the computer, the set of structured inputs that were generated from a model derived from the intermediate representation to the selected code segment in the intermediate representation of the program; and
   executing, by the computer, the program at the selected code segment using the set of structured inputs generated from the model derived from the intermediate representation.

19. The computer program product of claim 18 further comprising:
   determining, by the computer, whether the violation of the policy was detected during execution of the program using the structured inputs; and
   responsive to the computer determining that the violation of the policy was detected during execution of the program using the structured inputs, determining, by the computer, a root cause context of the violation of the policy and performing, by the computer, the set of action steps based on the root cause context of the violation of the policy.

20. The computer program product of claim 15 further comprising:
   monitoring, by the computer, execution of the program in the intermediate representation to detect any security bugs by observing any violations of defined security policies.

* * * * *